US012775407B1

(12) United States Patent
Kaplan et al.

(10) Patent No.: US 12,775,407 B1
(45) Date of Patent: Oct. 27, 2026

(54) ADDRESS SCRAMBLING FOR MEMORY BANDWIDTH IMPROVEMENT

(71) Applicant: Amazon Technologies, Inc., Seattle, WA (US)

(72) Inventors: Patricio Kaplan, Palo Alto, CA (US); Ron Diamant, San Jose, CA (US); Sharukh Shahajahan Shaikh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/980,370

(22) Filed: Dec. 13, 2024

(51) Int. Cl.
*G06F 12/00* (2006.01)
*G06F 3/06* (2006.01)

(52) U.S. Cl.
CPC .......... *G06F 3/0638* (2013.01); *G06F 3/0604* (2013.01); *G06F 3/0673* (2013.01)

(58) Field of Classification Search
CPC ..... G06F 3/0638; G06F 3/0604; G06F 3/0673
USPC .......................................................... 711/154
See application file for complete search history.

(56) References Cited

U.S. PATENT DOCUMENTS

2010/0106954 A1* 4/2010 Muchsel ............. G06F 12/1491 380/46
2013/0332711 A1* 12/2013 Leidel ................... G06F 9/3851 712/227
2019/0205244 A1* 7/2019 Smith ...................... G06F 3/065
2020/0027497 A1* 1/2020 Shin ..................... G11C 11/4087
2021/0064435 A1* 3/2021 Brewer ................. G06F 13/128

FOREIGN PATENT DOCUMENTS

WO WO-9202989 A1 * 1/1992 .......... H03M 7/3086

* cited by examiner

*Primary Examiner* — Mardochee Chery
(74) *Attorney, Agent, or Firm* — Weaver Austin Villeneuve & Sampson LLP

(57) ABSTRACT

An address having a set of address bits is received to access a memory device having a plurality of memory channels. The set of address bits may include an atomic address that indexes to an atomic data transfer unit, and an address offset that indexes into an offset in the atomic data transfer unit. At least a part of the atomic address is provided as an input to a hash function that provides a one-to-one mapping of a unique output for each unique input. A memory index is derived based on an output of the hash function. A memory address formed by concatenating the memory index with the address offset is provided for accessing the memory device.

20 Claims, 8 Drawing Sheets

ADDRESS SCRAMBLING FOR MEMORY BANDWIDTH IMPROVEMENT

BACKGROUND

Some computing devices may include large amounts of memory to support modern-day applications, such as, high performance computing, machine learning, gaming, artificial intelligence, or multi-media processing, among others. Generally, a memory device may connect with different components of a computing device via a plurality of memory channels. Each memory channel can be an interconnect bus of a certain width based on a data transfer unit. Each memory channel can be used to access the memory device for write or read operations. Thus, memory bandwidth is maximized when all the memory channels are being used at the same time.

BRIEF DESCRIPTION OF THE DRAWINGS

Various embodiments in accordance with the present disclosure will be described with reference to the drawings, in which.

DETAILED DESCRIPTION

Figure 1:
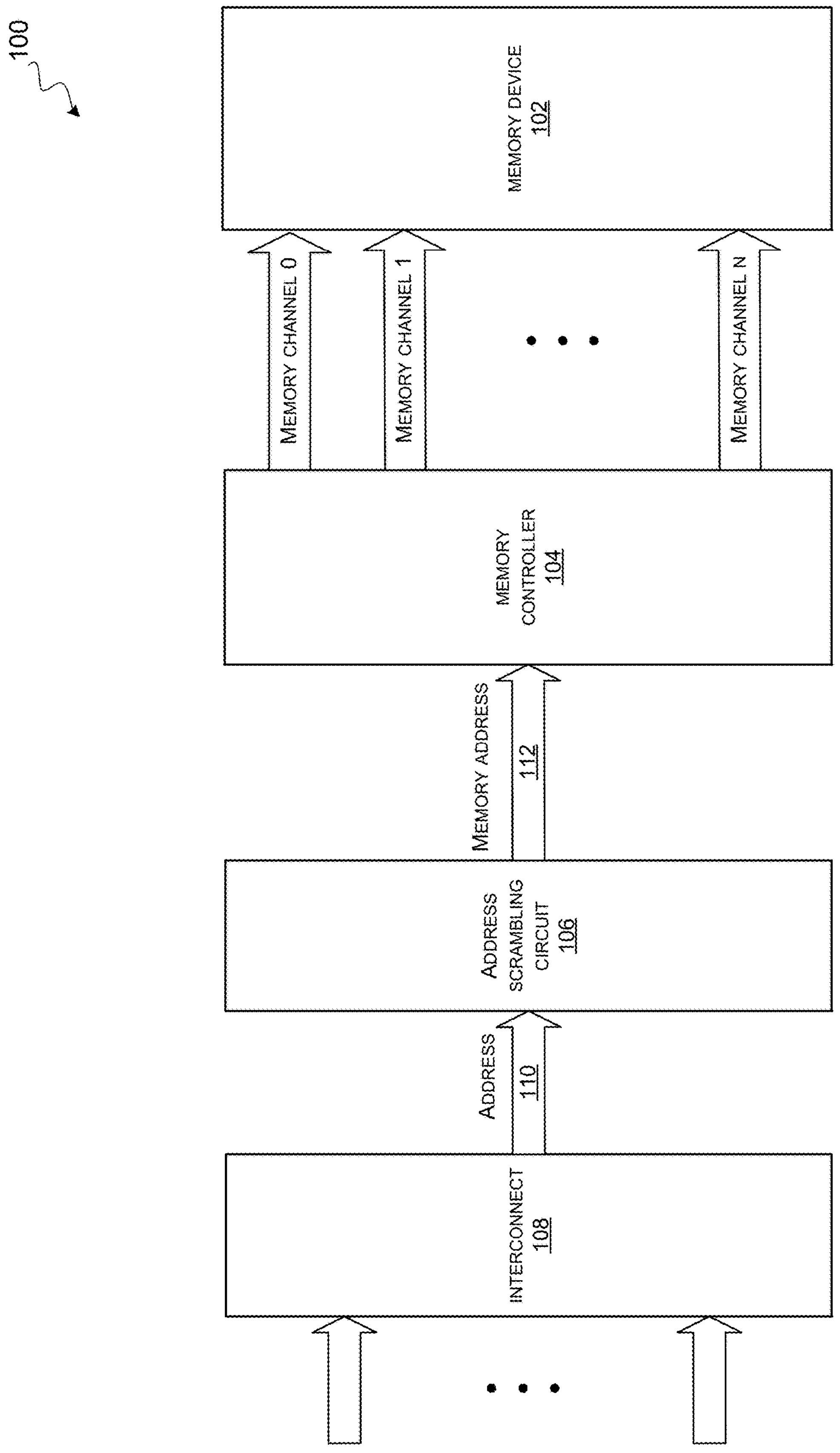
FIG. 1 illustrates an example of an integrated circuit (IC) device comprising a memory device having a plurality of memory channels.

A memory device may connect to different components of a computing device via a plurality of memory channels. The computing device can be any suitable integrated circuit (IC) device comprising a plurality of components, such as, one or more of processors, accelerator devices, memory devices, memory controllers, direct memory access (DMA) controllers, input/output (I/O) controllers, among others, that communicate with each other using one or more interconnect buses. In various examples, the memory devices may include high bandwidth memory (HBM), synchronous dynamic random-access memory (SDRAM), etc., that may include a plurality of memory channels based on the implementation of the IC device. As an example, the IC device can be a neural network processor or a graphics processing unit (GPU) that includes a HBM having 32 or more memory channels to support execution of various applications in artificial intelligence (AI), high performance computing (HPC), gaming, multi-media processing, web hosting, etc. In some examples, the memory device may include multiple dual data rate (DDR) SDRAMs to communicate with a plurality of processing cores in a server computer. However, it can be a challenging task to keep all the memory channels active at the same time to maximize the memory bandwidth in computing devices having a large number of memory channels.

Various techniques for address translation that attempt to maximize the memory bandwidth can be implemented. For example, in one implementation, software can be used to remap sequential transfers to spread the accesses across different memory channels. However; this implementation can increase software complexity since allocation of the remapping data structures has to be done efficiently and effectively. Another implementation may use hashing of a certain atomic unit based on the data transfer size (e.g., 256 bytes) that can provide efficient accesses to the memory device for sequential transfers. However, this implementation may perform better for large data transfers, but may result in long strides between the accesses for small data transfers which can reduce memory bandwidth utilization. Some implementations may include performing exclusive-OR (XOR) operations between certain portions of the address bits that may represent a typical stride length. This implementation may perform slightly better with small data transfers; however, the memory bandwidth utilization may depend upon the stride length. Thus, it is desirable to have a robust address translation mechanism that can distribute memory accesses across all the memory channels for different data transfer sizes and/or stride lengths.

Techniques described herein can be used to improve memory bandwidth utilization by using an address scrambling circuit that generates memory addresses for the memory controller to access the memory device uniformly across all the memory channels. Each memory channel can be an interconnect bus that can transfer data to and from the memory device based on an atomic data transfer unit. For example, the atomic data transfer unit may correspond to a page size (e.g., 256 bytes, 1024 bytes, etc.) supported by the memory device. The address scrambling circuit may receive an address to access the memory device that may include an atomic address that indexes to the atomic data transfer unit, and an address offset that indexes into an offset in the atomic data transfer unit. For example, the atomic address may be used to point to a memory page in the memory device, and the address offset may be used to point to a location in the memory page based on the offset.

The address scrambling circuit may be operable to receive at least a part of the atomic address and generate a hash value based on a hash function that provides a one-to-one mapping of a unique output for each unique input. As an example, the hash function can be a 32-bit CRC hash function, a 64-bit CRC hash function, or other suitable hash function. The address scrambling circuit may be further operable to swizzle a selected portion of the hash value to generate a memory index that includes a channel index for selecting one of the plurality of memory channels. The memory index can be concatenated with the address offset to form a memory address that can be used by the memory controller to access the memory device. Thus, using a one-to-one mapping function on the atomic address bits and further swizzling the output of the hash function can provide different channel indices for different atomic addresses to maximize the memory bandwidth utilization by distributing the memory access across the memory channels.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of an IC device 100 comprising a memory device 102 having a plurality of memory channels. As an example, the IC device 100 can be a neural network processor, a GPU, or any computing device that may utilize large amounts of memory to support execution of different applications. The IC device 100 can be implemented using a system-on-a-chip (SoC), a field programmable gate array (FPGA), or application specific integrated circuits (ASICs), among others.

The memory device 102 may be coupled to a memory controller 104 via N number of memory channels including a memory channel 0, a memory channel 1, and a memory channel n. The memory controller 104 may be operable to access the memory device 102 using a memory address 112 provided by an address scrambling circuit 106. Each of the N memory channels may be an interconnect bus having a certain data bus width. In some implementations, each memory channel can be an Advanced extensible Interface (AXI) bus having a variable data bus width of 256 bits, 512 bits, 1024 bits. The memory device 102 may be a high bandwidth memory (HBM), a DDR SDRAM, or another suitable memory type that is operable to communicate with other components of the IC device 100 via N number of memory channels. As an example, N can be 32 or more for the HBM. In some implementations, the N number of memory channels may be divided into multiple banks, and each bank may include multiple rows.

The address scrambling circuit 106 may be operable to receive an address 110 from one of the components of the IC device 100 via an interconnect 108 to access the memory device 102 for a write or a read operation. In various implementations, the IC device 100 may include one or more processors, accelerators, DMA controllers, I/O controllers, or other suitable components (not shown in FIG. 1) based on the functionality supported by the IC device 100. For example, a DMA controller may be configured to transfer data stored in a buffer in an accelerator to the memory device 102, or transfer data stored in the memory device 102 to the buffer in the accelerator.

The address 110 may include a set of address bits based on the specification and implementation of the IC device 100. The set of address bits may be split into an atomic address that indexes to an atomic data transfer unit, and an address offset that indexes into an offset in the atomic data transfer unit. As an example, the set of address bits may include 36 address bits, and the lower 8 address bits may correspond to the address offset based on the atomic data transfer unit being 256 bytes, and the remaining higher address bits may correspond to the atomic address. As another example, the lower 10 address bits may correspond to the address offset based on the atomic data transfer unit being 1024 bytes. In some implementations, the atomic data transfer unit may correspond to a page size supported by the memory device 102. Thus, the atomic address can be used to point to one of the pages in the memory device 102, and the address offset can be used to point to a memory location in the selected page.

Different implementations can be used for address translation in order to maximize the memory bandwidth. One implementation may allocate a different memory map to each memory channel. For example, a first memory range 0-1 GB may be mapped to the memory channel 0, a second memory range 1 GB-2 GB may be mapped to the memory channel 1, and so on. However, this implementation may demand a complicated software implementation to allow effective allocation of the data structures.

Another implementation may use a 256 bytes (256B) hash algorithm using 8 address bits for the atomic data transfer unit being 256 bytes. For example, address [7:0] may be hashed to the memory channel 0, address [15:8] may be hashed to the memory channel 1, and so on. This implementation may simplify the software due to sequential memory accesses, however; for smaller data transfers, the memory bandwidth may not be utilized efficiently. For example, when the number of memory channels is 32 (e.g., N is 32), performing 8 KB (32×256 bytes) of memory accesses may maximize the memory bandwidth, but data transfers that are smaller than 8 KB may result in longer strides in memory accesses, thus, providing relatively lower performance.

In another implementation, an XOR operation may be performed between some of the address bits based on a certain stride length to select one of the memory channels. For example, an XOR operation may be performed between the address bits [12:8] and the address bits [20:16] to generate the memory address 112 based on a 64 KB stride length, which can provide a better distribution of memory accesses for smaller data transfers. However, this implementation is mostly dependent on the stride length. This is further described with reference to FIG. 2.

Figure 2:
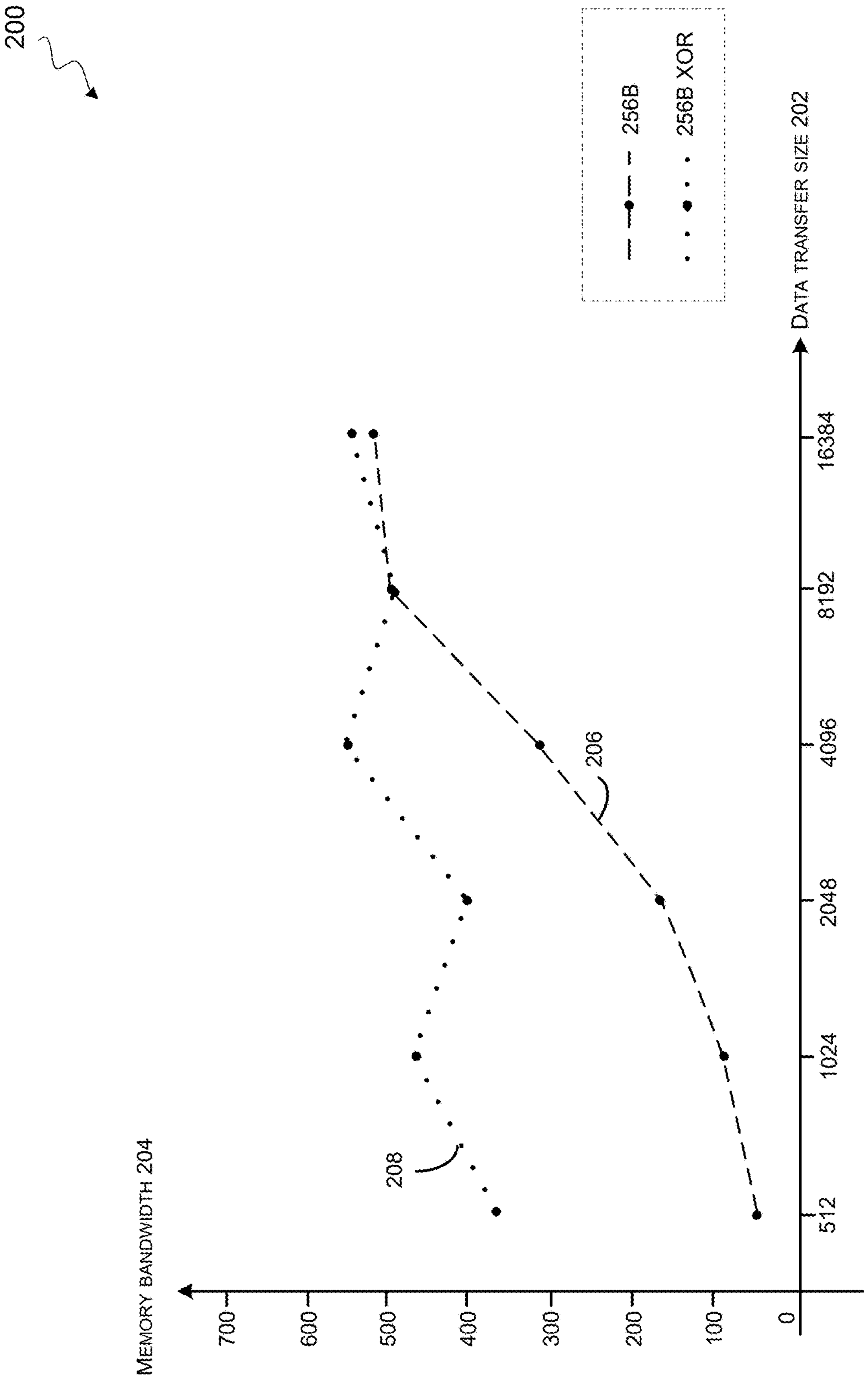
FIG. 2 illustrates an example of a graph that shows memory bandwidth utilization for different data transfer sizes using 256 bytes hash and 256 bytes XOR implementations for address translation.

FIG. 2 illustrates an example of a graph 200 that shows memory bandwidth utilization for different data transfer sizes using 256 bytes hash and 256 bytes XOR implementations for address translation.

In FIG. 2, a curve 206 shows the relationship between a memory bandwidth 204 and a data transfer size 202 using the 256B (256 bytes) hash implementation, and a curve 208 shows the relationship between the memory bandwidth 204 and the data transfer size 202 using the 256B XOR implementation. As shown by the curve 206, the memory bandwidth 204 is low when the data transfer size 202 is small (e.g., 512 bytes, 1024 bytes, 2048 bytes), and increases slowly as the data transfer size 202 increases to 4096 bytes. There is a maximum boost in the memory bandwidth 204 when the data transfer size 202 reaches 8192 bytes from 4096 bytes, and a smaller boost when the data transfer size 202 reaches 16384 bytes from 8192 bytes.

As shown by the curve 208, the memory bandwidth 204 is relatively higher for different data transfer sizes 202 as compared to the 256B hash implementation. For example, there is boost in the memory bandwidth 204 for smaller data transfer sizes 202 below 8192 bytes. However, in both these implementations, the memory bandwidth 204 depends on the data transfer size 202, and is generally low for smaller data transfer size 202.

Techniques described herein can provide a more uniform distribution of memory accesses across the N memory channels using an address scrambling circuit for address translation. The address scrambling circuit may perform address translation using a one-to-one mapping function that provides a unique memory index to access the memory device 102 for each unique combination of address bits, and a swizzler function to further randomize a channel index for selecting the memory channel from the N memory channels. This is further described with reference to FIG. 3.

Figure 3:
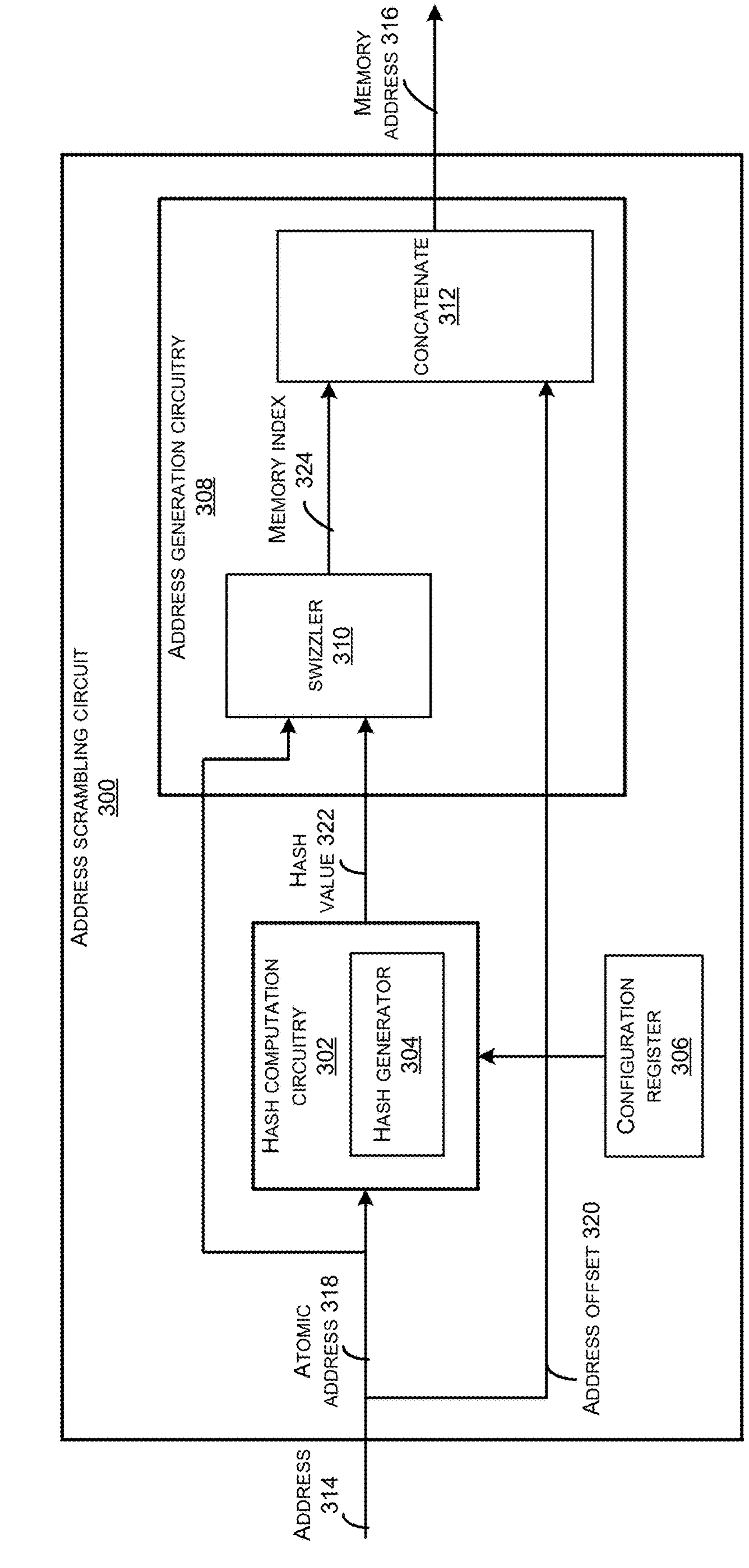
FIG. 3 illustrates an example of an address scrambling circuit that can be used to generate a memory address to be used by a memory controller to access the memory device, in accordance with some embodiments.

FIG. 3 illustrates an example of an address scrambling circuit 300 that can be used to generate a memory address to be used by the memory controller to access the memory device, in accordance with some embodiments. The address scrambling circuit 300 can be an example of the address scrambling circuit 106 in FIG. 1.

The address scrambling circuit 300 may include hash computation circuitry 302, a configuration register 306, and address generation circuitry 308. The address scrambling circuit 300 may be operable to receive an address 314 having a set of address bits, and provide a memory address 316 to access a memory device. For example, the address 314 may be similar to the address 110 received by the address scrambling circuit 106 via the interconnect 108 from one of the components of the IC device 100. The address 314 may include a set of address bits that includes an atomic address 318 that indexes to an atomic data transfer unit, and an address offset 320 that indexes into an offset in the atomic data transfer unit. In some implementations, the atomic data transfer unit may correspond to a page size supported by the memory device 102.

The hash computation circuitry 302 may support implementing a plurality of hash functions. Each hash function may provide a one-to-one mapping of a unique output for each unique input. In some embodiments, the plurality of hash functions may include a 32-bit cyclic redundancy check (CRC) hash, and a 64-bit CRC hash. The hash computation circuitry 302 may be operable to select the hash function based on an input from the configuration register 306. In some implementations, the configuration register 306 may also store corresponding polynomial coefficients for generating each hash function. The hash computation circuitry 302 may be further operable to receive an input containing a part of the atomic address 318, or the entire atomic address 318. In some examples, the hash computation circuitry 302 may receive a lower portion of the atomic address 318 based on the implementation of the hash function. The hash computation circuitry 302 may include a hash generator 304 operable to generate a hash value 322 from the atomic address 318 according to the selected hash function and the corresponding polynomial coefficients.

The address generation circuitry 308 may be operable to derive a memory index 324 based on the hash value 322 using a swizzler module 310. The swizzler module 310 may be used to swizzle or re-arrange selected portions of the hash value 322. In some embodiments, the swizzler module 310 may be used to swizzle or re-arrange an upper portion of the atomic address 318 with a selected portion of the hash value 322. The address generation circuitry 308 may be further operable to generate the memory address 316 formed by concatenating the memory index 324 with the address offset 320 using a concatenation module 312. The memory address 316 may be similar to the memory address 102 that can be used by the memory controller 104 to access the memory device 102. The swizzle module 310 and the concatenation module 312 can be implemented, for example, using multiplexers and/or wires.

The memory index 324 may include a channel index that can be used to select the memory channel from the N memory channels 0, 1, . . . , and n. In various embodiments, the channel index may correspond to a least significant bit (LSB) portion of the hash value 322, a most significant bit (MSB) portion of the memory index 324, or can be selected randomly from the memory index 324. The memory index 324 may also include a bank index to select one of the banks of the memory device 102, and a row index to select one of the rows of the memory device 102, based on the implementation of the memory device 102.

Figure 4:
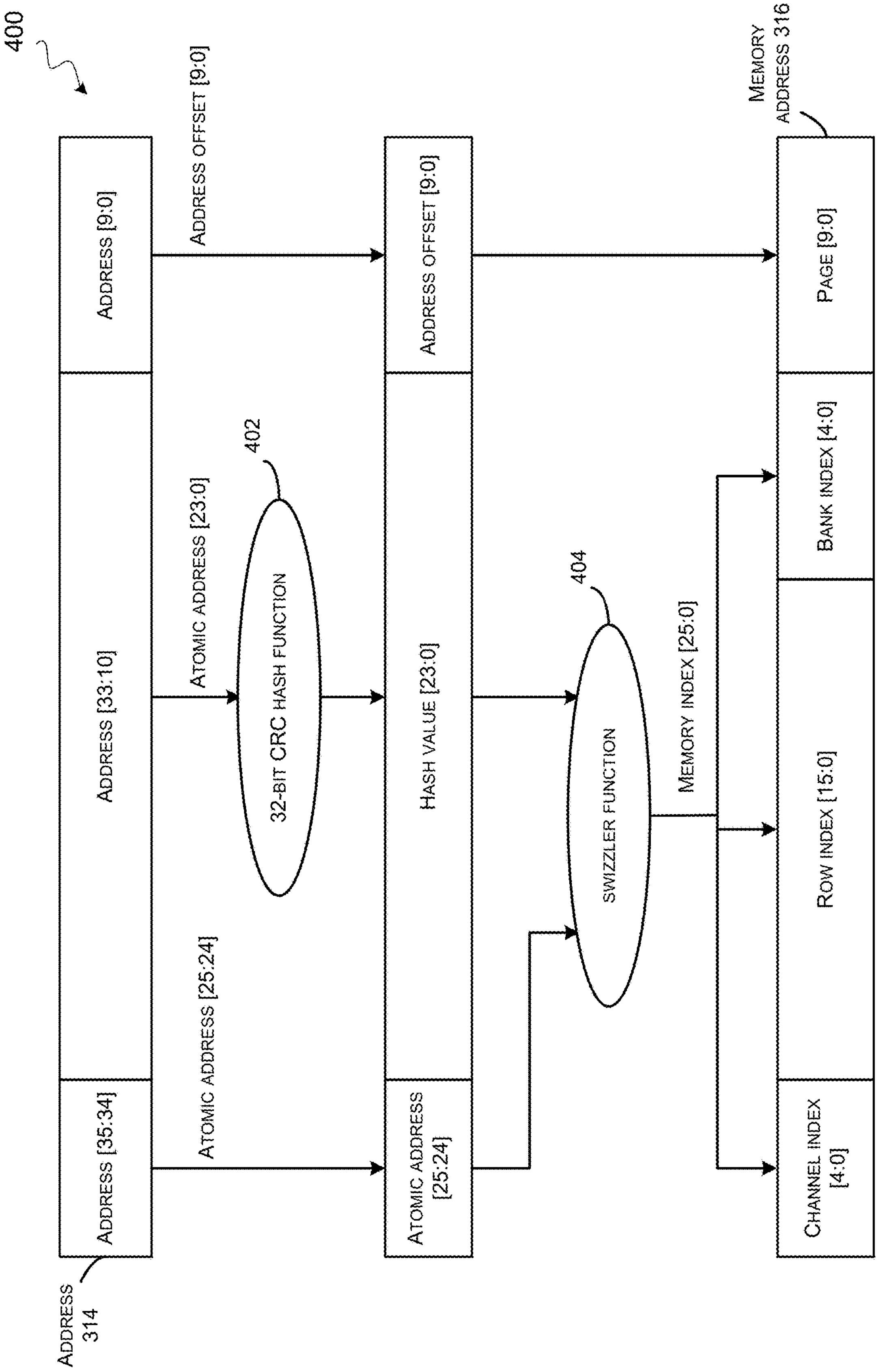
FIG. 4 illustrates an example of an address translation scheme to translate an address using a 32-bit CRC hash function that provides one-to-one mapping, in accordance with some embodiments.

FIG. 4 illustrates an example of an address translation scheme 400 to translate the address 314 using a 32-bit CRC hash function that provides one-to-one mapping, in accordance with some embodiments. As an example, the memory device 102 may include 32 memory channels, e.g., N is 32. The 32-bit CRC hash function may be implemented by the hash generator 304, as described with reference to FIG. 3.

As an example, the address 314 may include a set of address bits [35:0]. The address bits [9:0] may correspond to an atomic data transfer unit that supports a 1024 bytes page size. The address bits [35:10] may be split into an atomic address [25:0] that can be used to index into a page of the memory device 102, and an address offset [9:0] to index into an offset within the page. A lower portion of the atomic address [25:0], e.g., atomic address bits [23:0], may be provided as the input atomic address 318 to a 32-bit CRC hash function 402 implemented by the hash generator 304. An upper portion of the atomic address [25:0], e.g., atomic address bits [25:24] may be provided to the swizzler module 310. The 32-bit CRC hash function 402 may provide a one-to-one mapping of a unique output hash value [23:0] for each unique input value of the atomic address [23:0]. The hash value [23:0] may be provided to the address generation circuitry 308 as the input hash value 322.

The address generation circuitry 308 may use the swizzler module 310 to perform a swizzler function 404 on a concatenation of the atomic address [25:24] with a selected portion of the hash value [23:0] to derive the memory index 324. As shown in FIG. 4, a memory index [25:0] derived using the swizzler function 404 may include a channel index [4:0], a row index [15:0], and a bank index [4:0]. The channel index [4:0] may correspond to hash value bits [4:0] of the hash value [23:0], memory index bits [25:21] of the memory index [25:0], or a combination of random bits of the memory index [25:0] based on the swizzler function 404. The row index [15:0] may be used to select one of the rows, and the bank index [4:0] may be used to select one of the banks of the memory device 102. The channel index [4:0] may be used to select a memory channel from the 32 memory channels of the memory device 102.

The memory index [25:0] may be provided as the memory index 324 to be concatenated with the address offset [9:0] by the concatenate module 312 to form the memory address 316. In some examples, the memory controller 104 may use the memory channel selected using the channel index [4:0] to access a page of the memory device 102 based on the row index [15:0] and the bank index [4:0], and a specific location on the page using the address offset [9:0]. It should be understood that in other implementations, various indices and offset can have different bit widths.

Figure 5:
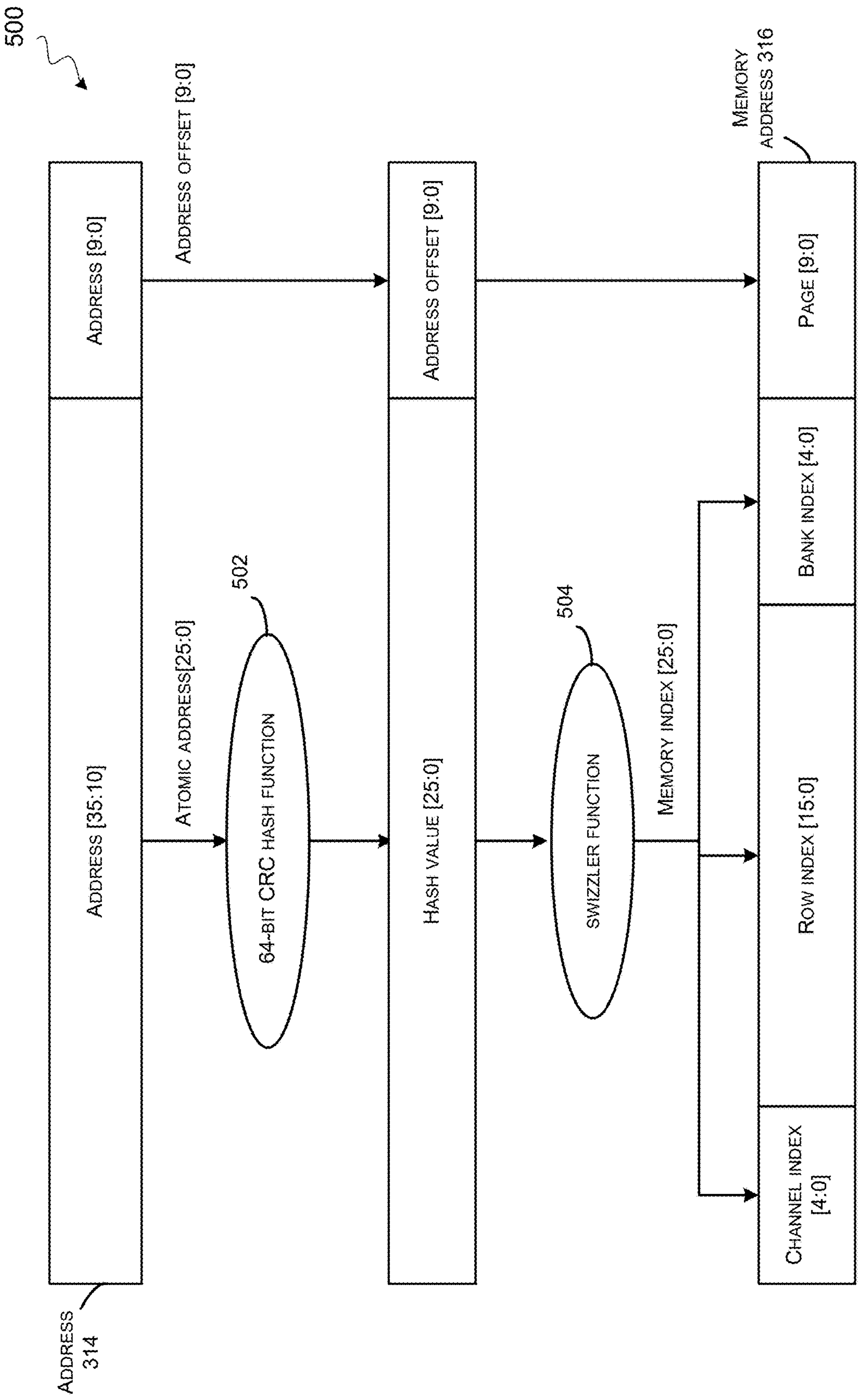
FIG. 5 illustrates an example of an address translation scheme to translate an address using a 64-bit CRC hash function that provides one-to-one mapping, in accordance with some embodiments.

FIG. 5 illustrates an example of an address translation scheme 500 to translate the address 314 using a 64-bit CRC hash function that provides one-to-one mapping, in accordance with some embodiments. As an example, the memory device 102 may include 32 memory channels, e.g., N is 32. The 64-bit CRC hash function may be implemented by the hash generator 304, as described with reference to FIG. 3.

As an example, the address 314 may include a set of address bits [35:0]. The address bits [9:0] may correspond to an atomic data transfer unit that supports a 1024 bytes page size. The address bits [35:10] may be split into an atomic address [25:0] that can be used to index into a page of the memory device 102, and an address offset [9:0] to index into an offset within the page. The entire atomic address [25:0] may be provided as the input atomic address 318 to a 64-bit CRC hash function 502 implemented by the hash generator 304. The 64-bit CRC hash function 502 may provide a one-to-one mapping of a unique output hash value [25:0] for each unique input value of the atomic address [25:0]. The hash value [25:0] may be provided to the address generation circuitry 308 as the input hash value 322.

The address generation circuitry 308 may use the swizzler module 310 to perform a swizzler function 504 on a selected portion of the hash value [25:0] to derive the memory index 324. As shown in FIG. 5, a memory index [25:0] derived using the swizzler function 504 may include a channel index [4:0], a row index [15:0], and a bank index [4:0]. The channel index [4:0] may correspond to hash value bits [4:0] of the hash value [25:0], memory index bits [25:21] of the memory index [25:0], or a combination of random bits of the memory index [25:0] based on the swizzler function 504. The row index [15:0] may be used to select one of the rows, and the bank index [4:0] may be used to select one of the banks of the memory device 102. The channel index [4:0] may be used to select a memory channel from the 32 memory channels of the memory device 102.

The memory index [25:0] may be provided as the memory index 324 to be concatenated with the address offset [9:0] by the concatenate module 312 to form the memory address 316. In some examples, the memory controller 104 may use the memory channel selected using the channel index [4:0] to access a page of the memory device 102 based on the row index [15:0] and the bank index [4:0], and a specific location on the page using the address offset [9:0]. It should be understood that in other implementations, various indices and offset can have different bit widths.

Thus, using the address scrambling circuit 300 to implement the 32-bit CRC hash function 402 and the 64-bit CRC hash function 502 to provide address translation using a 1:1 mapping can boost memory bandwidth without much dependency on the data transfer size. In some implementations, the address scrambling can be performed in a single clock cycle to minimize the impact on memory access latency.

Figure 6:
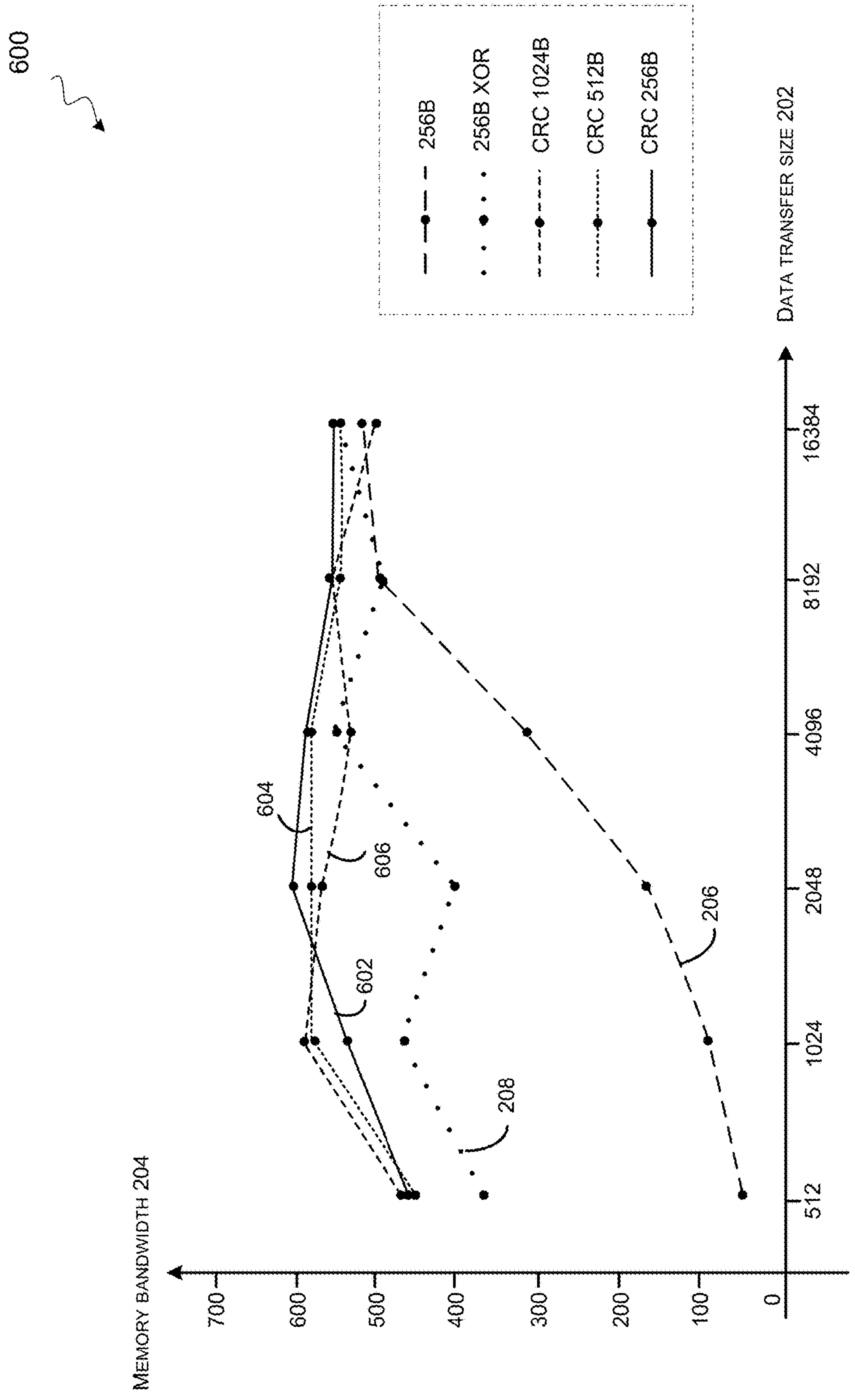
FIG. 6 illustrates an example of a graph that shows improvement in memory bandwidth utilization using CRC hash implementations for address translation, in some embodiments.

FIG. 6 illustrates an example of a graph 600 that shows improvement in memory bandwidth utilization using CRC hash implementations for address translation, in some embodiments. FIG. 6 shows the curves 206 and 208 described with reference to FIG. 2 for address translations using the 256 bytes hashing and 256 bytes XOR implementations.

FIG. 6 shows the relationship between the memory bandwidth 204 and the data transfer size 202 using 64-bit CRC hash implementation for different atomic data transfer units. For example, a curve 602 shows the relationship between the memory bandwidth 204 and the data transfer size 202 for the CRC 1024B (1024 bytes) implementation that uses an atomic data transfer unit that supports a 1024 bytes page size, a curve 604 shows the relationship between the memory bandwidth 204 and the data transfer size 202 for the CRC 512B (512 bytes) implementation that uses an atomic data transfer unit that supports a 512 bytes page size, and a curve 606 shows the relationship between the memory bandwidth 204 and the data transfer size 202 for the CRC 256B (256 bytes) implementation that uses an atomic data transfer unit that supports a 256 bytes page size.

As shown by the curves 602, 604, and 606, there is significant improvement in the memory bandwidth 204 for each of the atomic data transfer units, since accesses to the memory device 102 are distributed more uniformly across all the N memory channels independent of the data transfer size 202. Thus, the CRC hash implementation using the address scrambling circuit can provide higher performance for different data transfer sizes, as compared to the 256B hash and 256B XOR implementations described with reference to FIG. 2.

Figure 7:
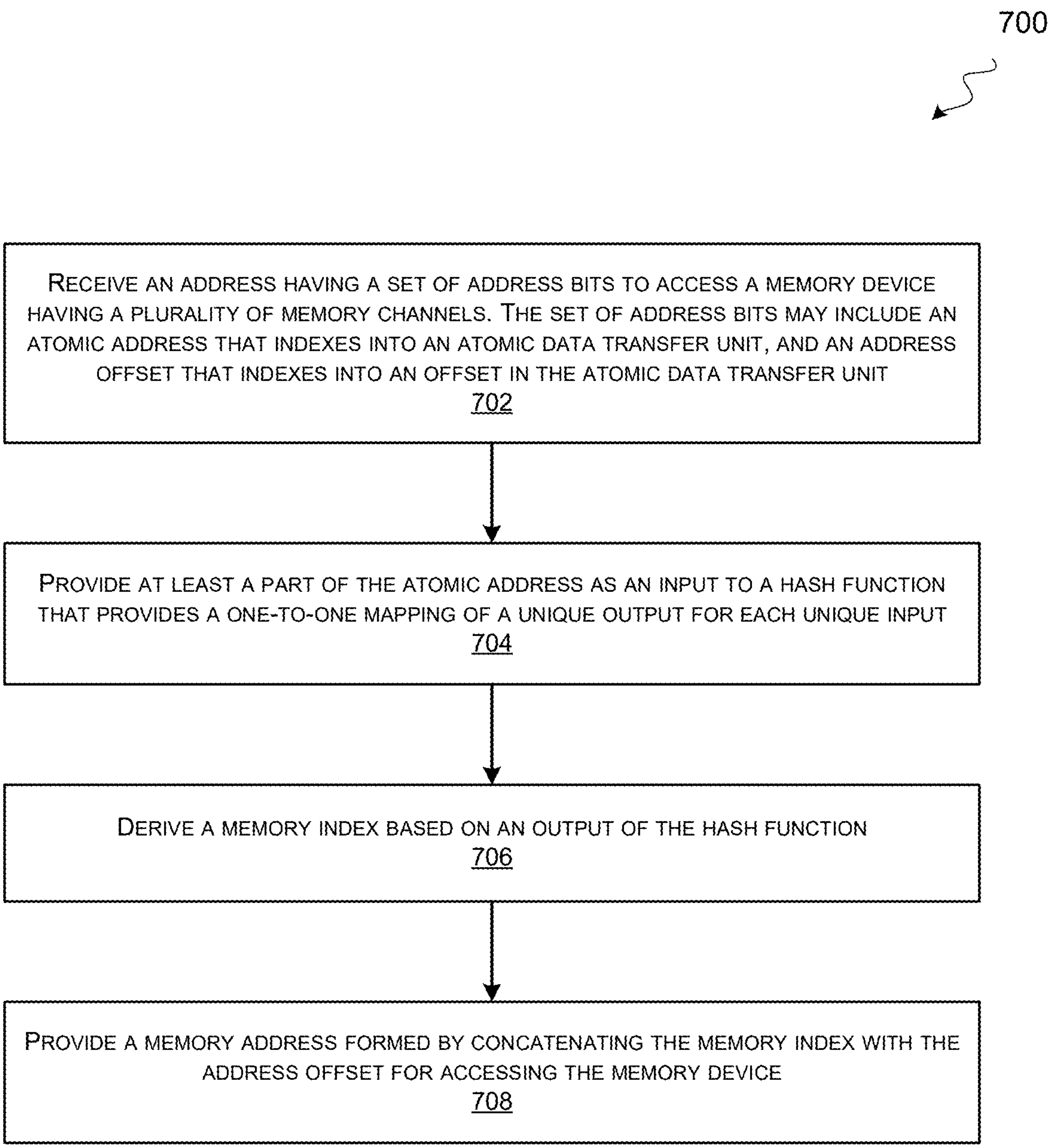
FIG. 7 illustrates an example of a flowchart for a method to generate a memory address from an address to access a memory device, in accordance with some embodiments.

FIG. 7 illustrates an example of a flowchart 700 for a method to generate a memory address to access a memory device, in accordance with some embodiments. The method may be performed by the address scrambling circuit 106, or the address scrambling circuit 300.

At step 702, the method includes receiving an address having a set of address bits to access a memory device having a plurality of memory channels. The set of address bits may include an atomic address that indexes to an atomic data transfer unit, and an address offset that indexes into an offset in the atomic data transfer unit. Referring back to FIG. 1, the address scrambling circuit 106 may receive the address 110 via the interconnect 108 from one of the components of the IC device 100 to perform a write access to the memory device 102. As an example, the memory device 102 may be an HBM having at least 32 memory channels (e.g., N is 32). The atomic data transfer unit may support 1024 bytes memory page using 10 address bits. Referring back to FIG. 5, the address 314 may include 36 address bits that includes atomic address [25:0] that indexes into a page in the memory device 102, and the address offset [9:0] that indexes into an offset within the page.

At step 704, the method includes providing at least a part of the atomic address of a certain bit width as an input to a hash function that provides a one-to-one mapping of a unique output for each unique input of that bit width. As an example, the hash function can be a 64-bit CRC hash for a 10-bit input, or a 32-bit CRC hash for an 8-bit input. Referring back to FIG. 3, the atomic address 318 may be provided to the hash computation circuitry 302. As described with reference to FIG. 5, the atomic address 318 can be the atomic address [25:0] which is provided as an input to the 64-bit CRC hash function 502 implemented by the hash generator 304. As described with reference to FIG. 4, the atomic address 318 can be the atomic address [23:0] which is provided as an input to the 32-bit CRC hash function 502 implemented by the hash generator 304. In some implementations, the address scrambling circuit can provide multiple hash generators for different hash algorithms (e.g., both 32-bit CRC and 64-bit CRC, and/or other suitable hash algorithms, etc.), and the particular algorithm and/or the number of input bits into the algorithm can be selectable (e.g., by programming a configuration register).

At step 706, the method includes deriving a memory index based on an output of the hash function. The hash generator 304 may provide the hash value [25:0] as the output of the 64-bit CRC hash function, which can be used to derive the memory index [25:0] using the swizzler function 504. For example, the swizzler module 310 may swizzle a selected portion (e.g., lower portion) of the hash value [25:0] to generate the memory index 324. The memory index [25:0] may include the channel index [4:0] that can be used to select the memory channel from the memory channels 0, 1, . . . , n of the memory device 102. The channel index [4:0] may correspond to a LSB portion of the hash value [25:0], e.g., hash value [4:0].

For a hash function that does not use all bits of the atomic address as input, the lower portion (or other portion) of the hash value corresponding to the same bit width of the input can be swizzled together with the remaining part of the atomic address to derive the memory index. For example, for a 32-bit CRC hash function that takes a 24-bit input, the hash value [23:0] can be swizzled with the remaining atomic address [25:24] that was omitted from the hash function to derive the memory index [25:0].

At step 708, the method includes providing a memory address formed by concatenating the memory index with the address offset for accessing the memory device. The address generation circuitry 308 may provide the memory address 316 by concatenating the memory index [25:0] with the address offset [9:0] using the concatenate module 312 (e.g., can be implemented using multiplexers and/or wires). The memory index [25:0] may point to a page in the memory device, and the address offset [9:0] may point to a memory location at an offset within the page where the write access may be performed.

Thus, as described with reference to FIGS. 3, 4, and 5, memory indices generated using the one-to-one hash function by the address scrambling circuit can randomize accesses to the memory device uniformly across all the memory channels, which can improve the memory bandwidth utilization independent of the data transfer sizes. Furthermore, CRC hash functions can be generated in a single clock cycle which does not impact the system performance.

Figure 8:
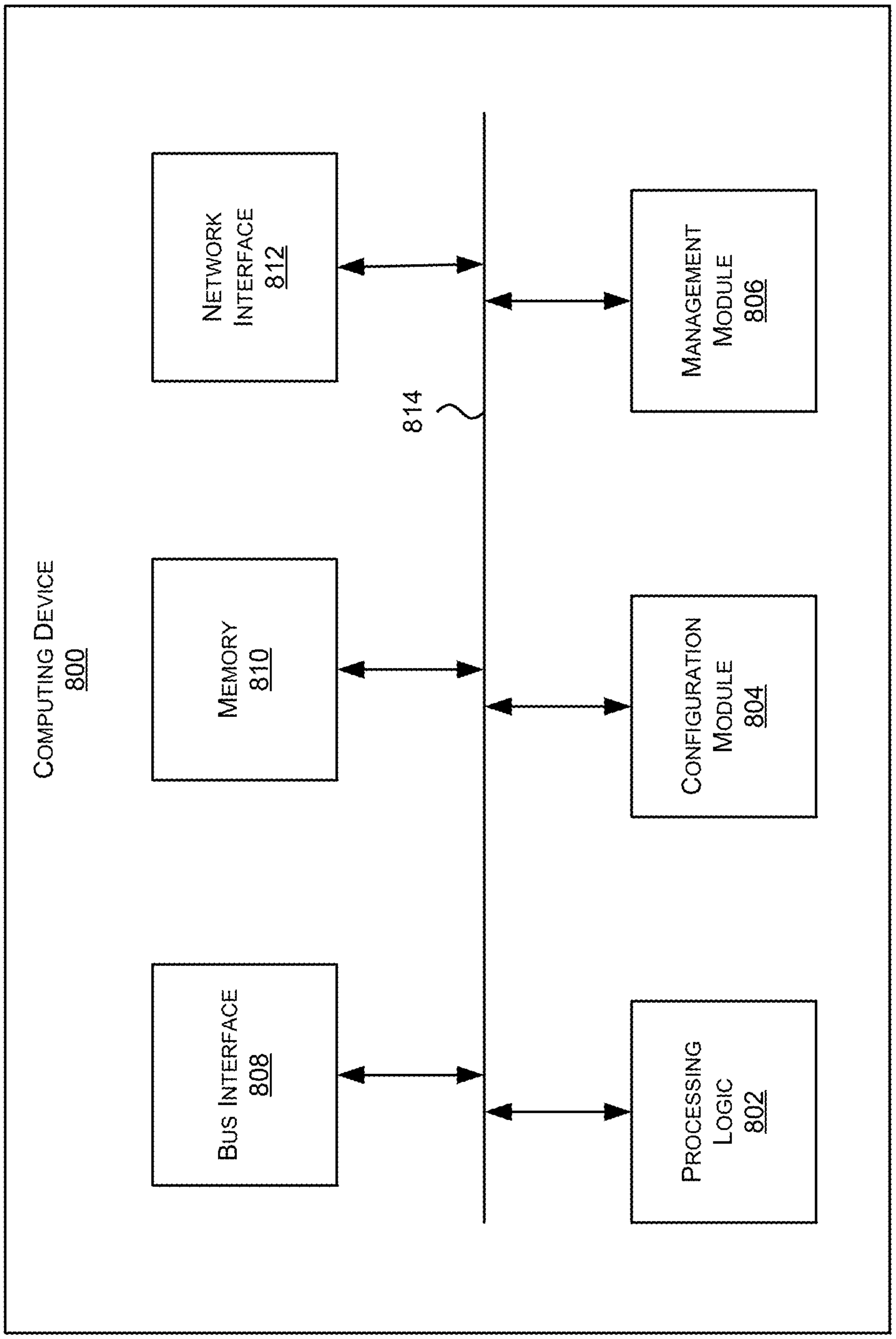
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. In some embodiments, the computing device 800 can be an example of the IC device 100 that includes the address scrambling circuit 106, or the address scrambling circuit 300.

In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, which are not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit (IC) device, comprising:

a memory device comprising a plurality of memory channels;

a memory controller operable to communicate with the memory device; and an address scrambling circuit operable to:

receive an address having a set of address bits to access the memory device, the set of address bits including an atomic address that indexes to an atomic data transfer unit, and an address offset that indexes into an offset in the atomic data transfer unit;

provide the atomic address as an input to a cyclic redundancy check (CRC) hash function, wherein the CRC hash function provides a one-to-one mapping of a unique output for each unique input, and generates a hashed address output from the atomic address;

derive a memory index by swizzling a lower portion of the hashed address output of the CRC hash function; and provide a memory address formed by concatenating the memory index with the address offset to the memory controller, wherein the memory controller is further operable to access data at the memory device using the memory address provided by the address scrambling circuit.

2. The IC device of claim 1, wherein the memory index includes a channel index to select the memory channel from the plurality of memory channels, and the channel index corresponds to a least significant bit (LSB) portion of the output of the CRC hash function.

3. The IC device of claim 1 wherein the CRC hash function is a 64-bit CRC hash function.

4. The IC device of claim 1, wherein the memory device is a high bandwidth memory having at least 32 memory channels.

5. A method, comprising:

receiving an address having a set of address bits to access a memory device having a plurality of memory channels, the set of address bits including an atomic address that indexes to an atomic data transfer unit, and an address offset that indexes into an offset in the atomic data transfer unit;

providing at least a part of the atomic address as an input to a hash function, wherein the hash function provides a one-to-one mapping of a unique output for each unique input, and generates a hashed address output from at least the part of the atomic address;

deriving a memory index based on the hashed address output of the hash function; and providing a memory address formed by concatenating the memory index with the address offset to access data at the memory device.

6. The method of claim 5, wherein the memory index includes a channel index to select the memory channel from the plurality of memory channels.

7. The method of claim 6, wherein the channel index corresponds to a least significant bit (LSB) portion of the output of the hash function.

8. The method of claim 6, wherein the channel index is a most significant bit (MSB) portion of the memory index.

9. The method of claim 5, wherein the input to the hash function is the entire atomic address, and wherein deriving the memory index includes swizzling a selected portion of the hashed address output of the hash function.

10. The method of claim 5, wherein the input to the hash function is a lower portion of the atomic address, and wherein deriving the memory index includes swizzling a concatenation of an upper portion of the atomic address with a selected portion of the hashed address output of the hash function.

11. The method of claim 5, wherein the hash function is a cyclic redundancy check (CRC) hash function.

12. The method of claim 5, wherein the hash function is a 32-bit cyclic redundancy check (CRC) hash, or a 64-bit CRC hash.

13. The method of claim 5, wherein the memory device has at least 32 memory channels.

14. An address scrambling circuit, comprising:

hash computation circuitry operable to:

receive an input containing a part of an atomic address included in an address having a set of address bits to access a memory device having a plurality of memory channels, the set of address bits including the atomic address that indexes to an atomic data transfer unit, and an address offset that indexes into an offset in the atomic data transfer unit; and generate a hashed address from the input according to a hash function that provides a one-to-one mapping of a unique output for each unique input; and address generation circuitry operable to:

derive a memory index based on the hashed address generated by the hash computation circuitry; and generate a memory address formed by concatenating the memory index with the address offset, wherein the memory address is used to access data from the memory device.

15. The address scrambling circuit of claim 14, wherein the hash computation circuitry implements a plurality of hash functions, and wherein the hash function being used to generate the hashed address is selectable.

16. The address scrambling circuit of claim 15, wherein the plurality of hash functions includes 32-bit CRC and 64-bit CRC.

17. The address scrambling circuit of claim 14, wherein the input to the hash function is an entire atomic address, and wherein deriving the memory index includes swizzling a selected portion of the hashed address.

18. The address scrambling circuit of claim 14, wherein the input to the hash function is a lower portion of the atomic address, and wherein deriving the memory index includes swizzling a concatenation of an upper portion of the atomic address with a selected portion of the hashed address.

19. The address scrambling circuit of claim 14, wherein the memory index includes a channel index to select the memory channel from the plurality of memory channels, and wherein the channel index corresponds to a least significant bit (LSB) portion of the hashed address.

20. The address scrambling circuit of claim 14, wherein the channel index is a most significant bit (MSB) portion of the memory index.

* * * * *